Patented Sept. 12, 1933

1,926,080

UNITED STATES PATENT OFFICE 1,926,080

ARTIFICIAL MUSK

John William Borman, Glen Ridge, N. J., assignor to Harold H. Fries, doing business as Fries Bros., New York, N. Y.

No Drawing. Application April 4, 1932
Serial No. 603,211

3 Claims. (Cl. 260—142)

The present invention relates to artificial musk, and more particularly to a chemical compound having the characteristic odor of musk.

The primary objects of my invention are to provide an artificial musk which, in fine odor, strength and price will compare favorably with the best artificial musks being marketed at the present time.

Many artificial musks have been made in the years past, but of these only three have survived, namely, the so-called Musk Xylol, Musk Ketone, and Musk Ambrette. Musk Xylol is the trinitro derivative of 1,3-dimethyl-6-tertiary-butyl-benzene. Musk Ketone is the dinitro derivative of 1,3-dimethyl-4-aceto-6-tertiary-butyl-benzene. Musk Ambrette is the dinitro derivative of 1-methyl-3-methoxy-6-tertiary-butyl-benzene. Of these artificial musks, the Musk Ketone is considered as having the finest odor, and the Musk Ambrette as having the strongest odor.

According to my present invention, I have found that by introducing another tertiary butyl group in the intermediate used in the production of Musk Ambrette, that is, in the 1-methyl-3-methoxy-6-tertiary-butyl-benzene, so as to form 1-methyl-3-methoxy-4 6-ditertiary-butyl-benzene, I obtain a product which upon nitration yields a dinitro derivative having a pronounced odor of musk, and which in fineness of odor and strength is intermediate between Musk Ketone and Musk Ambrette.

My artificial musk may be produced as follows: To a mixture of 820 grams of 1-methyl-3-methoxy-6-tertiary-butyl-benzene and 695 grams of tertiary butyl alcohol, there is allowed to flow, under vigorous stirring and cooling so as to keep the temperature at about 20° C., 550 grams of concentrated sulphuric acid. 500 cc. of a solvent such as xylol is then added and the product washed with water until free from acid, and when it is found to be neutral it is dried and fractionally distilled. The uncombined 1-methyl-3-methoxy-6-tertiary-butyl-benzene is recovered, and can be again used. The fraction coming over between 120° and 130° C. at 4-5 mm. contains the 1-methyl-3-methoxy-4, 6-ditertiary-butyl-benzene required for further treatment. To this fraction is added an equal volume of methanol, from which the desired product crystallizes out, and, upon filtering, washing and drying, it is obtained in the form of white crystals having a congealing point of 57.5° C. This product, which may be considered as an intermediate for use in the preparation of artificial musk is, to the best of my knowledge, a new chemical product.

140 grams of this crystallized product is slowly added to 1400 grams of 95% nitric acid, under constant stirring at a temperature held between —5° and +5° C. When all the crystalline product has been added, the mixture is allowed to stand for some time, after which it is poured onto ice water and the reaction product, which is in the form of an oil, is extracted with toluol, washed until neutral, and the toluol recovered in vacuum. The weight of the crude nitrated product will be approximately 155 grams. On crystallizing this from methanol twice, it is obtained in its pure state in the form of white, shiny crystals which are insoluble in water, somewhat soluble in 95% ethyl alcohol, and readily soluble in methanol and acetone and having a melting point of 111.8°–113.2° C. This substance is a new chemical compound having the characteristic musk odor.

While I have described but a single method of preparing the new chemical compound having the odor of musk, it is to be understood that my invention is primarily directed to said product, and not any method of preparing the same, since such may be varied without departing from the spirit of my invention.

What I claim is:

1. The chemical compound 1-methyl-3-methoxy-4, 6-ditertiary-butyl-2, 5-dinitro-benzene, said compound having a melting point of 111.8° to 113.2° C.

2. The method of making artificial musk which comprises nitrating 1-methyl-3-methoxy-4, 6-ditertiary-butyl-benzene to obtain the dinitro derivative thereof.

3. The method of making artificial musk which comprises introducing a tertiary butyl group into 1-methyl-3-methoxy-6-tertiary-butyl-benzene, and nitrating the resulting 1-methyl-3-methoxy-4, 6-ditertiary-butyl-benzene to obtain the dinitro derivative thereof.

JOHN W. BORMAN.